United States Patent
Wiegenstein et al.

(10) Patent No.: US 10,025,688 B2
(45) Date of Patent: Jul. 17, 2018

(54) SYSTEM AND METHOD FOR DETECTING DATA EXTRUSION IN SOFTWARE APPLICATIONS

(71) Applicants: Andreas Wiegenstein, Mannheim (DE); Markus Schumacher, Einhausen (DE); Xu Jia, Heidelberg (DE)

(72) Inventors: Andreas Wiegenstein, Mannheim (DE); Markus Schumacher, Einhausen (DE); Xu Jia, Heidelberg (DE)

(73) Assignee: Virtual Forge GmbH, Heidelberg (DE)

( * ) Notice: Subject to any disclaimer, the term of this patent is extended or adjusted under 35 U.S.C. 154(b) by 692 days.

(21) Appl. No.: 13/621,379

(22) Filed: Sep. 17, 2012

(65) Prior Publication Data

US 2013/0024942 A1 Jan. 24, 2013

Related U.S. Application Data

(63) Continuation-in-part of application No. 13/046,257, filed on Mar. 11, 2011, now Pat. No. 8,402,547.
(Continued)

(51) Int. Cl.
G06F 21/00 (2013.01)
G06F 11/36 (2006.01)
(Continued)

(52) U.S. Cl.
CPC ........ *G06F 11/3604* (2013.01); *G06F 21/556* (2013.01); *G06F 21/577* (2013.01);
(Continued)

(58) Field of Classification Search
None
See application file for complete search history.

(56) References Cited

U.S. PATENT DOCUMENTS 6,092,194 A 7/2000 Touboul
6,742,178 B1 * 5/2004 Berry et al. .................. 717/130
(Continued)

FOREIGN PATENT DOCUMENTS

EP 1688856 8/2006

OTHER PUBLICATIONS

Bohm C., et al., "Flow Diagrams, Turing Machines and Languages with Only Two Formation Rules," *Communications of the ACM*, 9(5): 366-371, May 1966.
(Continued)

*Primary Examiner* — Christopher Revak
(74) *Attorney, Agent, or Firm* — Dinsmore & Shohl LLP

(57) ABSTRACT

Comprehensive techniques identify data leaks in software applications using Asset Flow Analysis (AFA) to determine whether critical data leaves a system through an exit point such that the data is no longer protected by mechanisms of the system. A novel data extrusion mechanism makes use of a relevant subset of all the possible data paths detected by AFA using a knowledge base of critical business functions and critical database content. The system checks if any code performs read access to critical business data and subsequently transfers this data beyond the control limits of the target system. The knowledge base can be extended by configuring which database content is to be regarded as critical in any given organization. The approach is particularly valuable in protecting systems that manipulate, distribute, or store sensitive information associated with financial, business, or personal data, including SAP® ABAP™ software applications.

16 Claims, 6 Drawing Sheets

Related U.S. Application Data

(60) Provisional application No. 61/313,765, filed on Mar. 14, 2010.

(51) Int. Cl.

| | | |
|---|---|---|
| *G06F 21/57* | (2013.01) | |
| *G06Q 40/00* | (2012.01) | |
| *G06F 21/55* | (2013.01) | |
| *H04L 29/06* | (2006.01) | |

(52) U.S. Cl.
CPC .......... *G06Q 40/00* (2013.01); *H04L 63/0227* (2013.01); *H04L 63/1416* (2013.01)

(56) References Cited

U.S. PATENT DOCUMENTS

| | | |
|---|---|---|
| 7,207,065 B2 | 4/2007 | Chess et al. |
| 7,284,274 B1 | 10/2007 | Walls et al. |
| 7,398,516 B2 | 7/2008 | Berg et al. |
| 7,404,212 B2 | 7/2008 | Radatti et al. |
| 7,418,734 B2 | 8/2008 | Berg et al. |
| 7,420,332 B2 | 9/2008 | Kato |
| 7,437,718 B2 * | 10/2008 | Fournet et al. ............... 717/133 |
| 7,607,172 B2 | 10/2009 | Zurko et al. |
| 7,669,238 B2 | 2/2010 | Fee et al. |
| 7,743,423 B2 * | 6/2010 | Lange et al. .................... 726/26 |
| 8,402,547 B2 * | 3/2013 | Wiegenstein et al. .......... 726/25 |
| 8,423,965 B2 * | 4/2013 | Goel et al. .................... 717/126 |
| 2005/0240999 A1 | 10/2005 | Rubin et al. |
| 2007/0061782 A1 | 3/2007 | Schreiner et al. |
| 2007/0180531 A1 | 8/2007 | Snover et al. |
| 2007/0226797 A1 | 9/2007 | Thompson et al. |
| 2008/0120604 A1 | 5/2008 | Morris |
| 2008/0313602 A1 | 12/2008 | Tillmann et al. |
| 2009/0293127 A1 | 11/2009 | Zurko et al. |
| 2010/0083240 A1 * | 4/2010 | Siman ........................... 717/144 |
| 2010/0251214 A1 * | 9/2010 | Bohling et al. ............... 717/124 |
| 2012/0017280 A1 | 1/2012 | Wiegenstein et al. |
| 2012/0151551 A1 | 6/2012 | Readshaw et al. |
| 2012/0198423 A1 * | 8/2012 | Bestgen et al. ............... 717/128 |
| 2013/0167241 A1 * | 6/2013 | Siman ............................. 726/25 |
| 2013/0312102 A1 * | 11/2013 | Brake et al. .................... 726/25 |

OTHER PUBLICATIONS

Chess B., et al., "Static Analysis for Security," *IEEE Security and Privacy*, 2(6): 76-79, 2004.

Cousot P., et al., "Abstract Interpretation: A Unified Lattice Model for Static Analysis of Programs by Construction or Approximation of Fixpoints," ACM POPL 1977.

Dahl O., et al., "Structured Programming," London: Academic Press, 1972.

Livshits B., "Static Techniques for Security," Section 7.3 in *Improving Software Security with Precise Static and Runtime Analysis*, Stanford University, Dec. 2006.

Zahn C., et al., "A Control Statement for Natural Top-down Structured Programming" presented at Symposium on Programming Languages, Paris, 1974.

Schumacher M., "Security Engineering with Patterns," Lecture Notes in Computer Sciens, Springer Verlag, 153-154, 203, 2003.

\* cited by examiner

Class ZVF_PATENT (aggregated)

```
CLASS zvf_patent DEFINITION PUBLIC FINAL

PUBLIC SECTION.

PROTECTED SECTION.

PRIVATE SECTION.

DATA pernr      TYPE i VALUE 1000.
  DATA authorized TYPE i VALUE 0.

METHODS z_example_exit.

METHODS z_example_asset
    EXPORTING
      data  TYPE string
      error TYPE string.

IMPLEMENTATION

METHOD z_example_exit.

DATA lv_data  TYPE string.
  DATA lv_error TYPE string.

CALL METHOD me->z_example_asset
    IMPORTING
      data  = lv_data
      error = lv_error.

IF lv_error IS NOT INITIAL.
    WRITE : / lv_error.
  ENDIF.

ENDMETHOD.

METHOD z_example_asset.

DATA : lv_error TYPE string.

SELECT PERID FROM PA0002 INTO data
               WHERE PERNR = me->pernr.
  ENDSELECT.

IF me->authorized = 0.
    CONCATENATE 'User' sy-uname
                'not authorized to access PERID' data
                INTO lv_error.
    error = lv_error.
    CLEAR data.
  ENDIF.

ENDMETHOD.

ENDCLASS.
```

FIG. 3 (Aggregated format)

Internal Format [201] of class ZVF_PATENT

```
ZVF_TC;CLAS;ZVF_PATENT;na;20120714;0001;,$1,ZVF_PATENT,4,$2,PERNR,I$2,AUTHORIZED
,I$3,METHOD z_example_asset.\n    DATA : lv_error TYPE string.\n   SELECT PERID
FROM PA0002 INTO data\n              WHERE PERNR = me->pernr.\n   ENDSELECT.\n
IF me->authorized = 0.\n     CONCATENATE 'User' sy-uname \n                    'not
authorized to access PERID' data\n                  INTO lv_error.\n    error =
lv_error.\n    CLEAR data.\n   ENDIF.\
nENDMETHOD.$4,Z_EXAMPLE_ASSET,1,,,$5,DATA,1,STRING,1$5,ERROR,1,STRING,1$3,METHOD
z_example_exit.\n   DATA lv_data TYPE string.\n   DATA lv_error TYPE string.\n
CALL METHOD me->z_example_asset\n       IMPORTING\n       data    = lv_data\n
error   = lv_error.\n   IF lv_error IS NOT INITIAL.\n     WRITE : / lv_error.\n
ENDIF.\nENDMETHOD.\n4,Z_EXAMPLE_EXIT,1,,,$
```

FIG. 4 (Internal format)

Data Flow Chart (Data Leak)

```
0   METHOD z_example_exit.
1
2     DATA lv_data  TYPE string.
3     DATA lv_error TYPE string.
4
5     CALL METHOD me->z_example_asset
6       IMPORTING
7         data   = lv_data
8         error  = lv_error.
9
10    IF lv_error IS NOT INITIAL.
11       WRITE : / lv_error.
12    ENDIF.

ENDMETHOD.
```

| Method Parameters (meta data) | | |
| --- | --- | --- |
| DATA | TYPE | STRING |
| ERROR | TYPE | STRING |

```
0   METHOD z_example_asset.
1
2     DATA : lv_error TYPE string.
3
4     SELECT PERID FROM PA0002 INTO data
5                  WHERE PERNR = me->pernr.
6     ENDSELECT.
7
8     IF me->authorized = 0.
9       CONCATENATE 'User' sy-uname
10                  'not authorized to access PERID' data
11                  INTO lv_error.
12      error = lv_error.
13      CLEAR data.
14    ENDIF.
15
16  ENDMETHOD.
```

FIG. 5

SYSTEM AND METHOD FOR DETECTING DATA EXTRUSION IN SOFTWARE APPLICATIONS

REFERENCE TO RELATED APPLICATIONS

This patent application is a continuation-in-part of U.S. patent application Ser. No. 13/046,257, filed Mar. 11, 2011, now U.S. Pat. No. 8,402,547, which claims priority to U.S. Provisional Patent Application Ser. No. 61/313,765, filed Mar. 14, 2010, the entire content of both of which are incorporated herein in by reference.

FIELD OF THE INVENTION

This invention relates generally to data loss/leak prevention and, in particular, to a system and method for detecting data extrusion in software applications, including SAP® ABAP™ applications.

BACKGROUND OF THE INVENTION

An increasing number of software solutions are built to identify data leaks in productive (operational) software programs. These solutions monitor and analyze network traffic (data) during the operation of the program(s) and try to categorize or identify critical data. If all (relevant) network traffic is analyzed correctly, this may, for example, protect against disclosure of confidential information (e.g. credit card numbers) to unauthorized parties.

The general term for this approach is called "Data Loss Prevention" (DLP, also known as "Data Leak Prevention"), and implementing DLP solutions is becoming popular in the information technology (IT) space. However the general concepts upon which current DLP solutions are based have several disadvantages and shortcomings.

DLP solutions look for data leaks, but existing tools work by monitoring data in motion. This requires that the applications that are to be monitored are running and that the solution has direct text access to all network traffic.

Existing DLP tools monitor data that is interchanged between users and/or applications over a network. In order to analyze network traffic, a sensor needs to be deployed per data channel. Identification of critical data is based on heuristic rather than firm information. This can lead to false positives if meaningless data has the same format as critical data. This may also lead to false negatives, if critical data is extracted in a modified or scrambled form the heuristic does not understand, or if the heuristic has a bug. With existing solutions only running/productive applications can be monitored. If the data analysis fails, there is no second chance to prevent data loss. Users that operate DLP solutions may see the critical/confidential data that has been detected, which may raise further sensitive issues.

ABAP (Advanced Business Application Programming) is a high-level programming language created by the German software company SAP. It is currently positioned, alongside the more recently introduced Java, as the language for programming the SAP Application Server, part of the NetWeaver platform for building business applications. Analyzing SAP applications for data leaks is critical for several reasons. First, SAP applications process the key assets of an organization, such as personal data, production data (intellectual property) and financial data. If this data is leaked to unauthorized parties, the affected company may fall prey to industrial espionage, receive bad press or even violate (privacy) laws. In addition, SAP applications are increasingly connected to external systems and are (remote) accessible by a continuously growing user base. As such, the exposure of SAP systems has grown. A large amount of SAP custom coding is outsourced, and this code must be analyzed for data leaks and "backdoors." SAP applications are more and more in the focus of hackers, which increases the likelihood of attacks.

SUMMARY OF THE INVENTION

This invention is directed at data loss/leak prevention in software applications, with particular emphasis on business impacts arising from the affected system. The system and method provide comprehensive techniques for identifying security leaks, and measuring the impact of those defects in the context of the business configuration and environment. These techniques include data flow analysis and control flow analysis. While a disclosed example relates to the detection of data extrusion in SAP® ABAP™ software applications, the techniques are not limited in terms of implementation, particularly if the application and/or system are called upon to manipulate, distribute, or store sensitive information associated with financial, business, or personal data.

The approach is based on a novel analysis mechanism called Asset Flow Analysis (AFA). A fundamental difference between conventional data flow and asset flow is that while data flow follows the path of data from an external source ("input") to an internal command or function ("sink") in order to analyze whether input is fed into a critical function, the asset flow determines whether critical data ("asset") leaves a system (through an "exit") and therefore is no longer protected by mechanisms of the system.

In general, asset flow analysis can be used to identify read access to critical business data (like credit card numbers) and visualize the subsequent use of this data. This allows identifying that code which accesses critical data and visualizes in what context this data is used. AFA greatly helps identifying back doors related to information leaks and data processing that does not adhere to compliance standards. It adds unique value to the security analysis of business applications.

A novel data extrusion mechanism makes use of a relevant subset of all the possible data paths detected by asset flow analysis: the data paths that actually transfer the data beyond the limits of the system. This automatically removes all false positive findings where critical data is read and processed internally, without any transfer outside of the system. The value of the data extrusion mechanism is specifically that only precise findings are delivered: Code that accesses critical data and also extrudes that very data.

The invention provides a knowledge base of critical business functions and critical database content, including the SAP standard (the knowledge base is equivalent to the ABAP specific language rules for data extrusion). The system checks if any ABAP code on a given system performs read access to critical business data and subsequently transfers this data beyond the control limits of the SAP system. If such code exists, a data leak has been identified and will be flagged as security violation. The knowledge base can be extended by configuring which database content is to be regarded as critical in any given organization.

BRIEF DESCRIPTION OF THE DRAWINGS

FIG. 3 illustrates a basic, aggregated form of the code of FIG. 2;

FIG. 4 shows the internal format of class ZFV_PATENT;

FIG. 5 is data flow chart; and

DETAILED DESCRIPTION OF THE INVENTION

Figure 1:
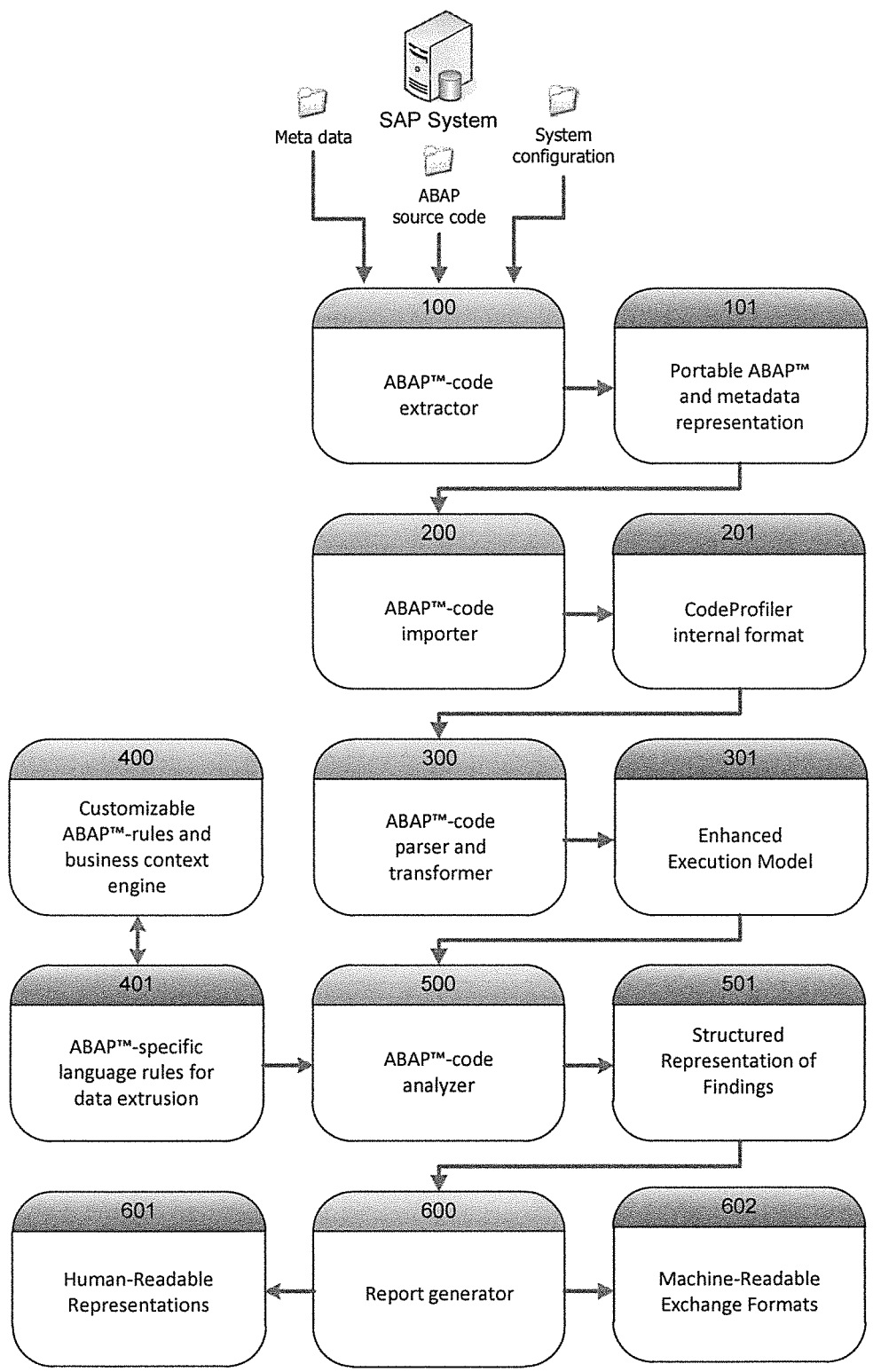
FIG. 1 illustrates major components of the invention.

Commonly assigned U.S. patent application Ser. No. 13/046,257 (Publication No 2012/0017280) introduced the concept of Asset Flow Analysis (AFA), which was designed to analyze the source code of software applications for access to critical (database) content and all subsequent data flows, including those in SAP/ABAP applications. This invention improves upon and extends AFA to include access to assets where the data flow transports these data outside of the control of the system ("extrusion"). This creates a precise overview of code that leaks data. Indeed, the invention detects data leaks in software applications even before an application is executed.

This invention overcomes shortcomings associated with existing DLP (data loss/leak prevention) approaches through the use of a fundamentally different concept to detect data leaks: Extrusion Prevention, which can be used in SAP environments. A point of novelty with this approach is to analyze source code rather than running applications. Key advantages of our invention over current DLP solutions include at least the following:

Proactiveness: An application can be analyzed before it is run. This significantly reduces the risk of data leaks, because they can be detected before the application operates on productive data;

Simplicity: No sensors are required to collect data on networks. At the same time, many more data endpoints can be monitored, independent of the protocol used to transfer the data;

Accuracy instead of heuristics: All critical database tables/columns in an SAP system are well known, since they are an integral part of the SAP ERP solution. This allows the invention to precisely determine which data is commonly regarded as critical and which is not;

Customization: users can customize which database tables/columns are relevant for monitoring in their organization. This eliminates excessive meaningless data and also allows to monitor access to custom database tables/columns used by the organization.

Transparency: The analysis works even if the data is transmitted in an encrypted or modified form, since data source- and endpoints are monitored at the code level.

Test focus: The application needs to be analyzed only after modifications to the code. Continuous monitoring (as in DLP) is not required.

Automation: The code analysis can be automatically triggered by any modification to the code. Any violation will stop the new code from becoming productive.

Compliance: Data leaks can be detected without analyzing any data. Therefore even users do not see any critical data—only the code that would leak is evident.

The invention makes use of Static Code Analysis (SCA) principles in order to identify all code that extracts critical data (assets) and exposes it to the outside. This is done by performing advanced data flow analysis. Standard SCA tools do not perform Asset Flow Analysis. And while SCA has been an established concept for many years, and while there are vendors that offer SCA tools for ABAP (see for example Virtual Forge's CodeProfiler: http://tinyurl.com/sapcertified-sca), there is currently no SCA tool for SAP ABAP that can determine if critical data is transported beyond the access control limits of an SAP system. Key advantages of the invention include at least the following:

Focus: Results show code with critical data access only if the data is also extruded, rather than any usage of the data (e.g. for merely internal computations).

Customization: users can customize which database tables/columns are relevant for monitoring in their custom applications according to the requirements of their organization.

There does exist a very basic data access tool called "where used list" delivered in the SAP standard that allows to find all code that accesses a given database table. This "where used list" is available in the ABAP workbench and simply lists all source code that accesses (reads or writes) data in a given database table. This only works, however, if the access to the database table is explicitly (not dynamically) coded and makes no difference which column of the table is accessed. It's also limited to the ABAP command that performs the database access (no asset flow analysis). Key advantages of this invention over the SAP "where used list" include:

Access Mode: Only read access to any given table is monitored, as opposed to read and write access by SAP's tool, which requires a high amount of manual post-processing.

Focus: Only read access to a critical column in a relevant table is monitored, as opposed to access to any column in a relevant table, as provided by SAP's tool, which requires a high amount of manual post-processing.

Relevance: Only read access that transfers the data beyond the access control capabilities of the SAP system is reported, as opposed to any access to the table by SAP's tool, which requires a high amount of manual post-processing.

Automation: This invention automatically checks all code for access to any of the known/defined critical tables, as opposed to SAP's tool, which requires manual execution for each table.

FIG. 1 illustrates major components of the invention, the interaction of which will now be described in detail. Component [100], the ABAP-code aggregator, collects code, code meta information and system configuration settings from the SAP database, and transforms the distributed SAP internal representation of this information into a complete, aggregated, interchangeable format [101]. The transformer can be triggered from within the SAP system or externally, e.g. via RFC (Remote Function Call—SAP's mechanism to call function modules in another SAP system or in an external application).

The ABAP-code and metadata importer [200] imports the previously extracted interchangeable representation into a built-in database. The database table model has been specifically created to store parsed ABAP code and related meta data in the most efficient way for analysis: the enhanced execution model. The ABAP-code parser [300] parses the ABAP interchangeable representation and transforms it into an enhanced execution model [301] to simplify rules analysis. The enhanced execution model is stored in the internal database and also contains ABAP authorization, ABAP control flow, and ABAP data flow information.

Rules engine [400] provides specific information and rules about critical database tables and columns as well as SAP standard commands and functions that transfer data beyond the control limits of an SAP system. These rules have been researched by the inventors in years of code analysis. The ABAP code analyzer [500] applies rules from the rules engine to the enhanced ABAP execution model. The probability of findings is computed based on ABAP authorization, ABAP control flow, ABAP data flow information as well as modification of the data during processing. The outcome is based on information in the rules engine. Report generator [600] provides the findings of the ABAP code analysis in various formats. The findings include detailed descriptions about the problem and provide guidance for a solution.

The ABAP-code aggregator [100] collects the ABAP source code of the various ABAP programming paradigms by resolving component inter-dependencies and by extracting all related source code from the SAP database. This source code is enriched by the invention with additional metadata about the code itself (e.g. function parameters which are not directly included in the source code, RFC-flags of function modules, authorization groups . . . ) and the SAP system (e.g. SAP release, Roles and Authorizations, Authorizations for transactions, relations between reports and transactions, active services, logs, etc.).

Since code and code meta information in a SAP ABAP system is distributed across many database tables, the code collection/extraction itself is based on considerable research carried out by the inventors. Each ABAP programming paradigm is stored in a different way in the SAP database. In each case, the inventors had to determine in which specific format and in which table the source code is stored. Since the SAP server provides integrated code versioning and distinguishes between active and inactive code variants, these factors had to be considered as well. Also, the inventors had to analyze where the respective meta information (e.g. method parameters, method declarations, class interfaces, super classes, related authorization objects, related logical databases . . . ) are stored and in what way this relation is technically represented (in the database) on the SAP server. The ABAP code fragments and their meta information that are originally diversely distributed in the SAP database are actually transformed into a complete, aggregate, portable ABAP and metadata representation [101]. This representation includes aggregated source code, parameters, attributes, comments, code meta information and system/meta information.

Figure 2:
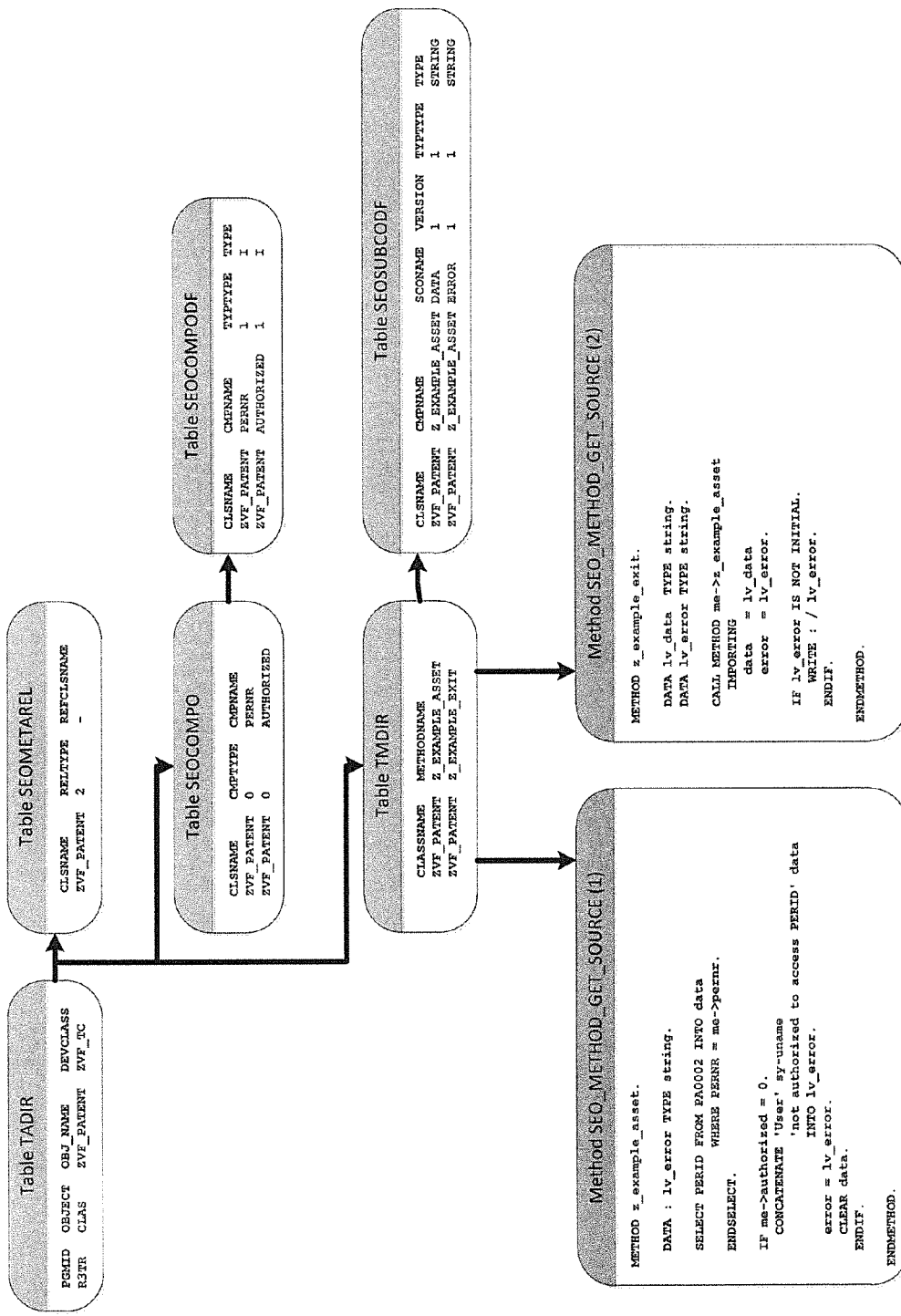
FIG. 2 is a schematic diagram that shows the code fragmentation in the SAP database based on an example ABAP class (ZVF_PATENT), which has two class attributes (pernr and authorized) and two class methods (z_example_exit and z_example_asset)

For demonstration purposes, we will now describe how a sample ABAP class called ZVF_PATENT is processed by the invention. The schematic of FIG. 2 shows the code fragmentation in the SAP database based on our example ABAP class (ZVF_PATENT), which has two class attributes (pernr and authorized) and two class methods (z_example_exit and z_example_asset).

The schematic shows the relations between database tables that hold code fragments as well as an SAP API function (SEO_METHOD_GET_SOURCE) that provides the source code of a single method. In order to extract this class, the invention first searches for the name of the class in SAP table TADIR, which contains a list of all ABAP code objects. Once the existence is confirmed, potential relations (super-classes or sub-classes) of this class are looked up in table SEOMETAREL. In the example, there are neither super- nor sub-classes.

Next, the class variables of ZVF_PATENT are looked up in table SEOCOMPO. The relevant table keys are CLSNAME (the name of the class) and CMPTYPE 0 (indicating a class variable). The variables names are stored in column CMPNAME. The data type of each identified variable is then read from table SEOCOMPODF. The relevant table keys are CLSNAME (the name of the class) and CMPNAME (the name of each variable). The column TYPTYPE indicates if the variable is of simple type (1) or an object reference (3), column TYPE determines the actual ABAP variable type.

Once the class variables have been identified, the class methods are read from table TMDIR. The relevant table key is CLASSNAME (the name of the class). The column METHODNAME holds the name of any given the method. For each method identified this way, the method parameters are read from table SEOSUBCODF. The relevant table keys are CLSNAME (the name of the class) and CMPNAME (the name of each variable). The column SCONAME holds the name of a parameter. The column TYPTYPE indicates if the variable is of simple type (1) or an object reference (3), column TYPE determines the actual ABAP variable type.

All information about the class is aggregated in the ABAP and metadata representation [101]. As a final step, the actual source code of each identified class method is read from the SAP database. This is done via the SAP standard method SEO_METHOD_GET_SOURCE which requires the method and class name as input. The source code is subsequently added to the ABAP and metadata representation [101]. In a basic, aggregated form built in accordance with the invention, the code of FIG. 2 looks like the schema of FIG. 3.

The ABAP-code importer [200] imports the aggregated code and metadata representation [101] into the CodeProfiler internal format [201], which is basically an in-memory representation of the aggregated code and metadata representation [101]. This internal format was designed to represent data in a way that subsequent read and write access by the parser takes place with minimal performance-impact. Performance is important, since an SAP system can contain more than 160 million lines of standard code. This standard code has to be analyzed as well, since practically all custom ABAP code calls SAP standard code (APIs) and the whole data/control flow—from the custom code to the standard code—has to be considered. The internal format [201] of ZVF_PATENT is shown in FIG. 4.

The code in the internal format [201] is then parsed and transformed by the ABAP™-code parser and transformer [300] into an Enhanced Execution Model [301]. This model is stored in a database and contains ABAP specific meta-information. It also describes data transports between different variables and functions as a basis for the ABAP data flow model. In order to build the Enhanced Execution Model [301], the parser analyzes the source code, module by module. A module in this context is a given ABAP function, subroutine, class method, report etc.

The parser first identifies all variables per module and stores their source code positions in the database. The parser then relates read access to a (source) variable to the corresponding write access to a (destination) variable per ABAP command as transitions in the database. In order to construct a data flow, the parser then relates the various data transitions between the different commands per code module to each other in the order of the control flow in the database. This generates several database tables, representing a data-flow graph inside a given code module. We do not explain the principle of data flow analysis in further detail here, since this mechanism is well known and has been described publically several times (see for example [1,4,7]). However, we show the special methods for conducting data and control flow analysis in ABAP programs.

In the following, we highlight special considerations for performing data flow analysis in ABAP, which the invention makes use of. First, the parser adds information about SAP authorization checks in the control flow of any given code module. Based on the local data flow graphs, the parser then builds a call graph between the different code modules by relating all commands that call other code modules to the called code module. In ABAP, this requires consideration of the meta data extracted from the SAP database.

The parameters of any code module have to be connected to the data flow transitions. Do to so, the parameters which are not stored in the source code have to be read from the meta information of any given code module that have been previously extracted. As a result of this step, the invention builds a complete call graph of the entire SAP standard coding, together with any given custom coding which is part of the inspection and any relevant SAP authorization checks detected in the code. This complete call graph represents a solid basis for all further analysis based on the rules provided by the ABAP-rules engine [400].

In order to build a data flow graph, the parser needs to consider specialties in the ABAP language. Whereas in most other languages data flow is propagated by API functions, in ABAP most data flows are caused by commands, that are implicitly a part of the ABAP language itself. Therefore the parser needs to consider all ABAP commands that exchange data locally and in the ABAP shared memory. Commands that exchange data in shared memory are e.g. SET PARAMETER, GET PARAMETER, EXPORT TO DATABASE, IMPORT FROM DATABASE, EXPORT TO DATA BUFFER, IMPORT FROM DATA BUFFER, EXPORT TO MEMORY ID, IMPORT FROM MEMORY ID, EXPORT TO SHARED BUFFER, IMPORT FROM SHARED BUFFER, EXPORT TO SHARED MEMORY, IMPORT FROM SHARED MEMORY, EXPORT TO INTERNAL TABLE, IMPORT FROM INTERNAL TABLE.

Commands that exchange data locally are e.g. CONCATENATE, MOVE, REPLACE, ASSIGN, SPLIT, APPEND, APPEND TO itab, LOOP AT itab, INSERT INTO itab, MODIFY itab, READ TABLE as well as the new string operations introduced in SAP basis 7.20 (SUBSTRING, SUBSTRING_AFTER, SUBSTRING_FROM, SUBSTRING_BEFORE, SUBSTRING_TO, SEGMENT, REPLACE, REPEAT, REVERSE, SHIFT_LEFT, SHIFT_RIGHT, CONDENSE, TRANSLATE, TO_UPPER, TO_LOWER, TO_MIXED, FROM_MIXED, ESCAPE, CONCAT_LINES_OF). Also the parser adds information about asset sources (e.g. database content) to the data flow. Assets are special variable sources that carry input, e.g. a value read from a critical database table or from an important configuration variable. The list of asset sources as well as their type is defined in the ABAP-rules engine [400].

Figure 6:
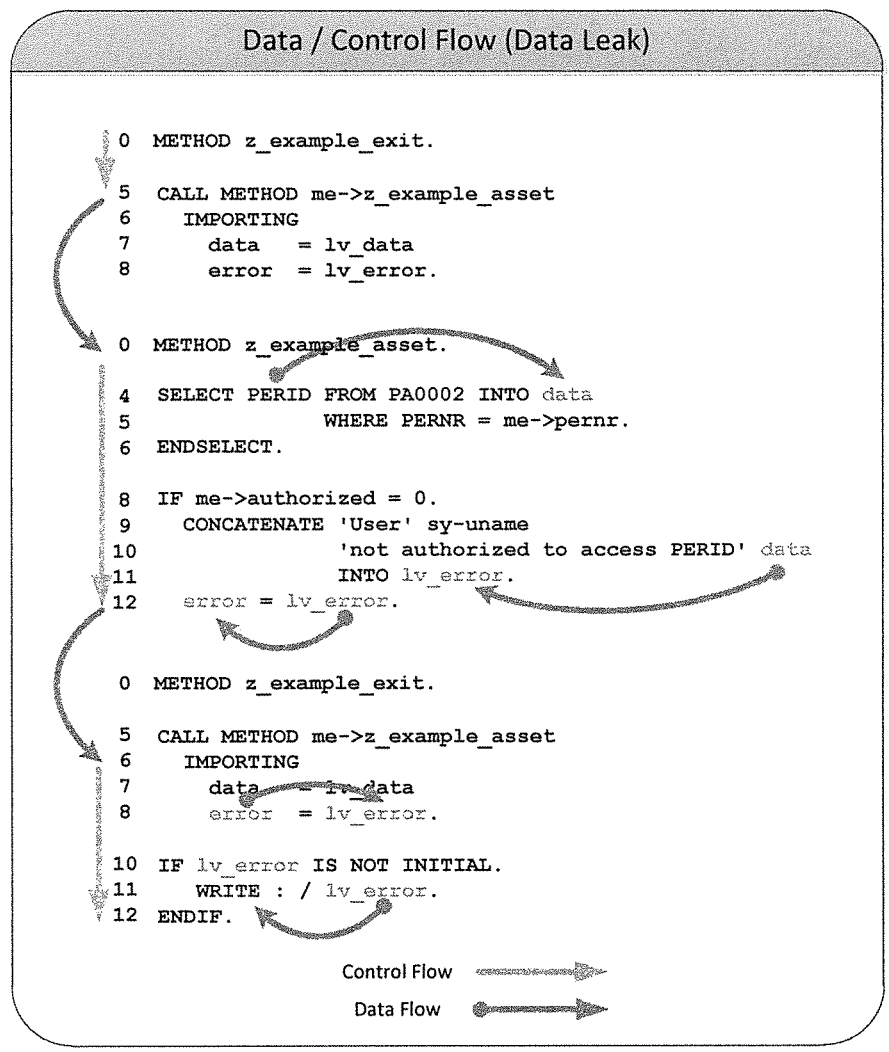
FIG. 6 shows data/control flow.

The Enhanced Execution Model [301] was designed to perform control and data flow analysis operations only once during a security analysis, in order to optimize performance and to keep memory resources small. Therefore, a complete control and data flow graph of the entire source code is created and persisted in the database in a compact format by the parser. An example for data and control flow graph and its compact representation is shown in FIG. 5 and FIG. 6. This performance/resource optimization is required in order to scan a complete SAP system in one run, which can contain more than 160 million lines of code.

The ability to scan an entire system in one run is important since SAP AG continuously releases service packs and hotfixes for its various system lines. This, in return, results in constant changes in APIs. Since ABAP developed by SAP customers and consulting companies always uses SAP standard APIs, the standard functions must be part of a data extrusion analysis in order to deliver reliable results. Therefore, only a complete system scan ensures that the behavior of the code base installed on any given SAP system is analyzed correctly. An isolated scan of custom code without considering the current SAP APIs on the affected SAP would not return correct results.

The ABAP-rules engine [400] contains ABAP-specific language rules for data extrusion tests [401] and provides methods to maintain and customize these rules. The standard rules represent an essential aspect of the invention, as they contain completely new, ABAP-specific testing approaches ("test cases") researched by the inventors. These test cases address unique functional concepts of an SAP system which have corresponding functionality in the ABAP language. The primary design of these test cases is to spot code that directly or indirectly reads critical information form the SAP system. Most of this critical information resides in the SAP database. The ABAP rules engine covers many database tables and columns that mark critical business data processed by the SAP standard and these are considered by the test cases. In order to also cover custom developments, the rules engine can be extended by users by tables and columns that mark critical customer data (used by add-ons or custom code).

The rules engine also includes information about critical database tables (e.g. tables holding HR data or financial data) and critical SAP standard functions that leak data to the outside (e.g. ALV grids, GUI downloads, FTP transfer). The rule set is adapted to changes of the ABAP language and SAP standard functions.

The ABAP-code analyzer [500] applies the ABAP-specific language rules [401] from the rules engine [400] to the Enhanced Execution Model [301]. It performs an ABAP-specific analysis for data leaks, based on technical effects in the code and the extracted meta information. In order to do this, all data paths (data flows) from critical information to an ABAP-command or API function that transfers this data beyond the control of the SAP System are analyzed. If a connection from a variable containing critical business/customer data to the outside is detected, a data leaks is reported. An example for such coding can be found in the ZVF_PATENT application. In this instance access to table PA0002, column PERNR (holding the social security number) is traced to a WRITE command that renders this information in the user interface.

The ABAP-code analyzer considers numerous commands and API's researched by the inventors that extrude data. These commands and API's can be categorized the following: data downloads to SAP client, write-access to clipboard, write-access to files, Pop-up screens, outgoing emails, outgoing HP connections, outgoing HTTP traffic, HTML output, system messages, spooler, RFC modules.

A Structured Representation of Findings [501] is generated that allows for prioritization by reflecting the computed business criticality per issue. The Report generator [600] reads the structured representation of the findings [501] and transforms them into Human-Readable Representations (e.g. PDF documents, and results in a user interface) [601] as well as Machine-Readable Exchange Formats (e.g. XML files) [602] that can be used to feed external bug tracking systems or dashboards.

As a succinct review, this invention specifically relates to data extrusion issues in ABAP code, with a particular emphasis on the business impact on the affected SAP system. In contrast to existing techniques, the system and method identify data extrusions through static analysis of ABAP code. All current ABAP programming paradigms may be extracted, including Reports, Programs and Forms, Classes and Methods, Includes, Function Pools and Function Modules, BSP applications, Web Dynpro applications as well as relevant meta data.

The invention can parse the extracted ABAP coding, identify data and control flows and determine any read access to the database via Open SQL commands. The invention has a predefined rule-base with a list of common critical database tables/columns in an SAP business context. Since the approach can determine read access to database tables in the code, all access to critical data can be identified with 100% accuracy. There is no need for heuristic analysis of the data.

The invention has a rule-base that can identify all (relevant) data exit points, i.e. ABAP commands and SAP API's that transfer the data they receive beyond the access control capabilities of an SAP system. Numerous data exit points may be identified, including server-side files, client-side files, SAPGUI user interface, HTTP traffic, HP traffic, RFC traffic, etc., even if the destination/protocol is encrypted or scrambled. By means of data and control flow analysis, data transfers may be identified between a read access to a critical database table/column and a data exit point. The invention can also analyze other sources of critical data, such as source code, server-side files and generic access to database tables.

Due to the data and control flow analysis, the invention can filter out any read access to critical data that does not result in a data leak (i.e. avoid false positives). Users may configure which database tables are critical in their specific business context to further reduce potential false positives. The invention allows identifying access to critical data without displaying or logging the actual data, as well as the identification of data leaks without running the application. This proactive approach greatly reduces the risk of losing data. A detailed human-readable report is generated with risk-values for all identified issues. A detailed machine-readable report is also output with risk-values and mitigation proposals for all identified issues.

REFERENCES

1. Bohm, Jacopini. "Flow diagrams, turing machines and languages with only two formation rules" Comm. ACM, 9(5):366-371, May 1966.
2. Brian Chess and Gary McGraw. Static analysis for security. IEEE Security and Privacy, 2(6):76-79, 2004.
3. Patrick and Radhia Cousot, Abstract interpretation: a unified lattice model for static analysis of programs by construction or approximation of fixpoints. ACM POPL 1977.
4. Dahl & Dijkstra & Hoare, "Structured Programming" Academic Press, 1972.
5. Fortify Software, Inc., U.S. Pat. No. 7,207,065, Apparatus and method for developing secure software, Issued on Apr. 17, 2007
6. Benjamin Livshits, section 7.3 "Static Techniques for Security," Stanford doctoral thesis, 2006.
7. Hanne Nielson, Flemming Nielson, and Chris Hankin. Principles of Program Analysis. Springer 1999.
8. Markus Schumacher, Security Engineering with Patterns, pp. 153-154, Lecture Notes in Computer Sciens, Springer Verlag, 2003
9. Zahn, C. T. "A control statement for natural top-down structured programming" presented at Symposium on Programming Languages, Paris, 1974.

The invention claimed is:

1. A method of detecting database extrusion in a software application that provides a knowledge base of critical business functions and critical database content, comprising the steps of:
receiving code adapted for execution on a target computer system having predefined protection limits;
configuring at least a portion of the database content to be regarded as critical;
performing a computerized data flow analysis on the code to determine the paths that will be taken by the source code during execution, the paths including data transfers between read accesses to critical data in the database and data exit points outside the database;
performing a computerized data extrusion analysis to determine if any of the paths identified by the data flow analysis are capable of actually transferring the critical data to the exit points and beyond the protection limits of the target system; and
if such source code exists, reporting the potential data extrusion leak as a security violation.

2. The method claim 1, wherein the analyses are static analyses performed on the code without actually executing the code.

3. The method claim 1, including the step of providing a predefined rule-base to identify relevant data exit points associated with commands and API's that transfer the data they receive.

4. The method claim 1, including the step of providing a predefined rule-base to identify critical data associated with a given organization.

5. The method claim 1, wherein the exit points are identified even if the destination or protocol is encrypted or scrambled.

6. The method claim 1, including the step of identifying read access to the critical data without displaying or logging the actual data itself.

7. The method claim 1, wherein the step of reporting includes the generation of a human-readable or machine-readable report including risk-values for all identified issues.

8. The method claim 1, wherein the critical data includes one or more of the following:
credit or debit card numbers,
financial data,
business data,
medical/pharmaceutical data,
military information, or
personal data.

9. The method claim 1, wherein:
the code includes meta information and computer system configuration settings associated with a particular software application;
the code is transformed into an interchangeable format including aggregated source code, parameters, attributes, comments, code meta information and system/meta information; and
the interchangeable format is parsed into an execution model to perform the analyses.

10. The method claim 9, wherein the source code is modified to include additional metadata about the code itself and the target system.

11. The method of claim 9, wherein the code, meta information and computer system configuration settings are received from a database.

12. The method of claim 9, wherein the step of transforming the code is triggered from within a computer system or through a remote function call.

13. The method of claim 9, wherein the execution model contains authorization, control flow, and data flow information.

14. The method claim 1, wherein the critical data includes one or more of the following:
   credit or debit card numbers,
   financial data,
   business data,
   medical/pharmaceutical data,
   military information, or
   personal data.

15. The method claim 1, wherein the computerized data extrusion analysis is performed by analyzing all data paths from critical data to a command or an API function operative to transfer this data beyond the control of the database system.

16. The method claim 1, wherein the command or API function comprises one or more of the following:
   data downloads to a database client,
   write-access to a clipboard,
   write-access to files,
   pop-up screens,
   outgoing emails,
   outgoing FTP connections,
   outgoing HTTP traffic,
   HTML outputs,
   system messages,
   spooler, and
   RFC modules.

* * * * *